Sept. 22, 1970            A. YOCHIM            3,529,754

APPARATUS FOR DISPENSING GRANULAR SUBSTANCES

Filed Oct. 11, 1968            3 Sheets-Sheet 1

Inventor
Albert Yochim
Pendleton, Neuman
by Seibold & Williams
Atty's

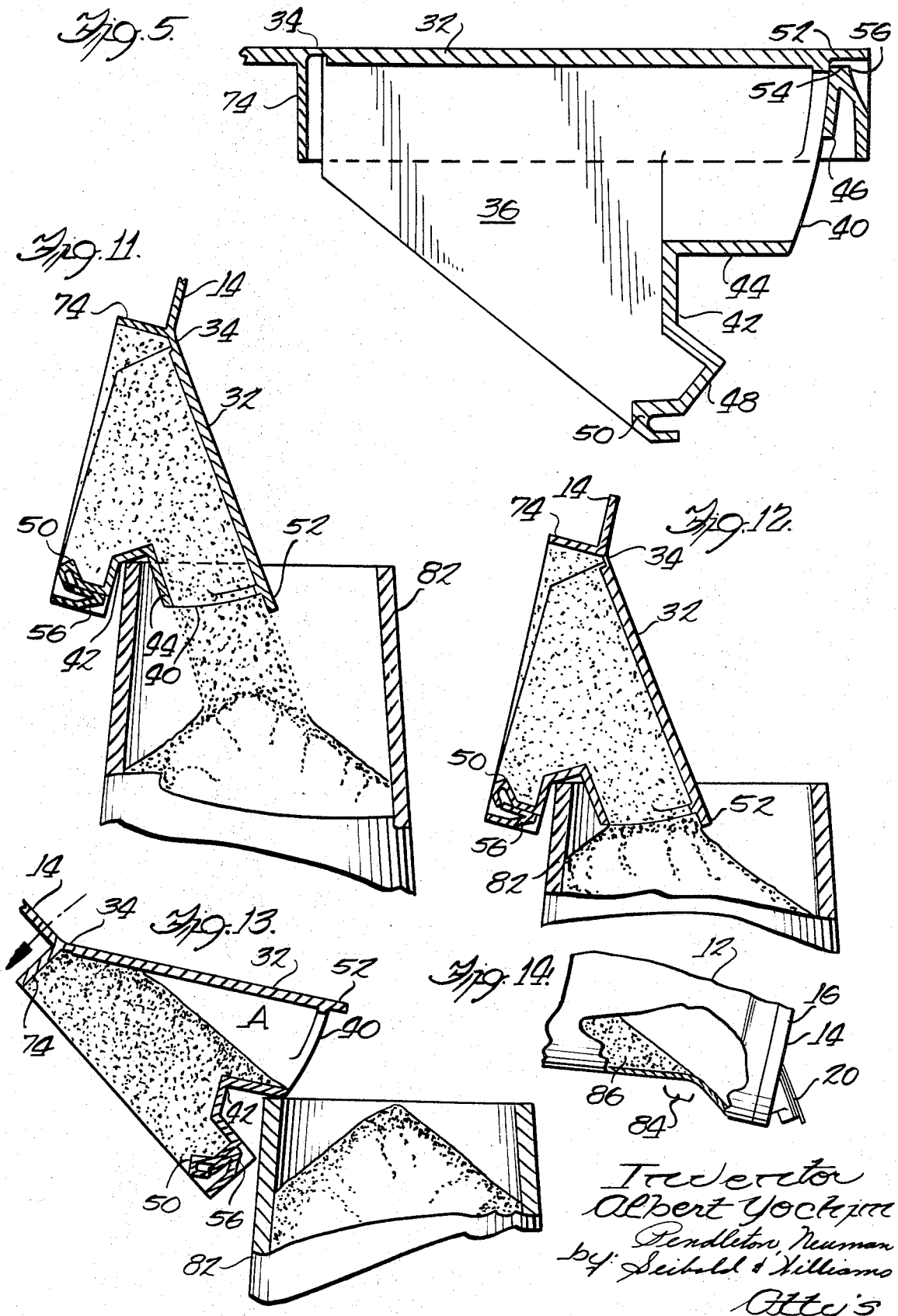

Sept. 22, 1970 — A. YOCHIM — 3,529,754
APPARATUS FOR DISPENSING GRANULAR SUBSTANCES
Filed Oct. 11, 1968 — 3 Sheets-Sheet 3
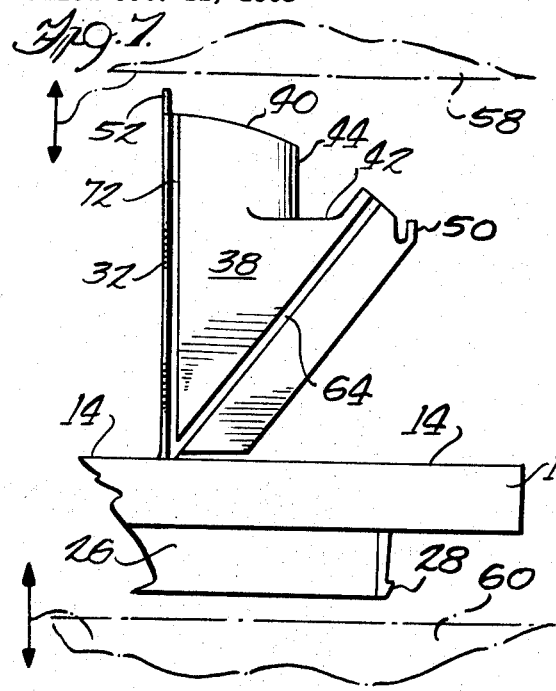
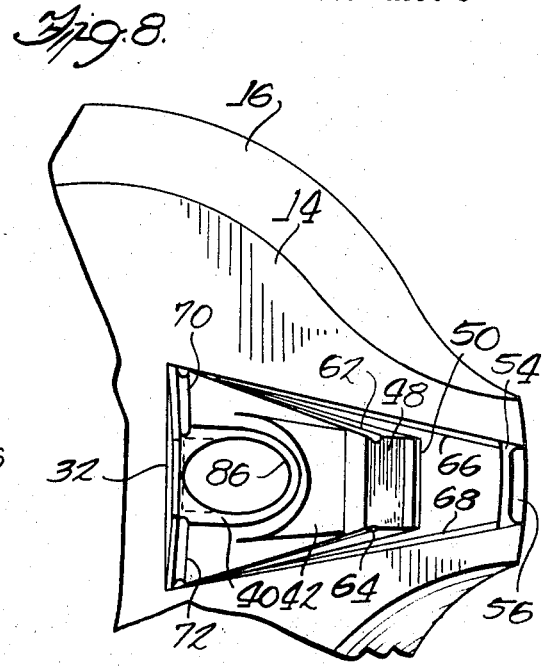
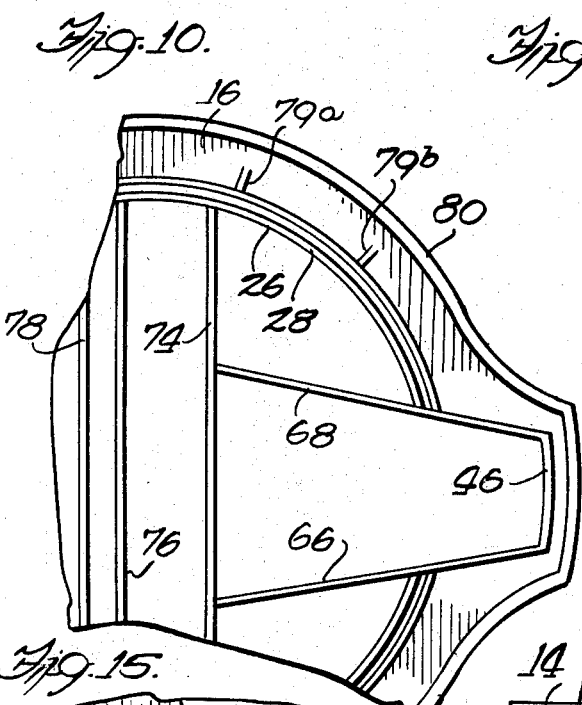
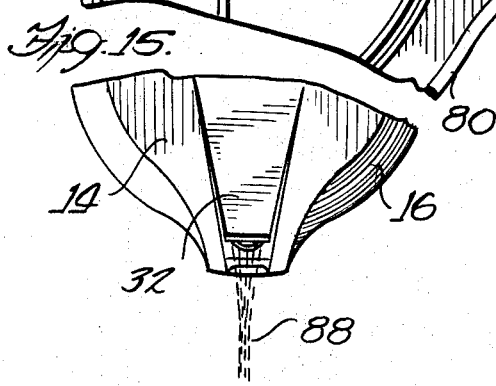
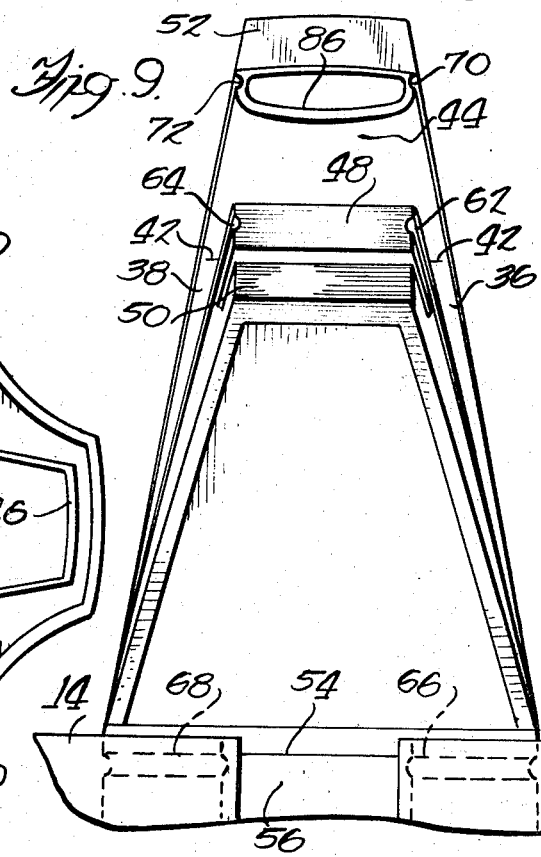
Inventor
Albert Yochim
by Pendleton, Neuman,
Seibold & Williams
Atty's United States Patent Office 3,529,754
Patented Sept. 22, 1970

3,529,754
APPARATUS FOR DISPENSING GRANULAR SUBSTANCES
Albert Yochim, Villa Park, Ill., assignor to Morton International, Inc., Chicago, Ill., a corporation of Delaware
Filed Oct. 11, 1968, Ser. No. 766,720
Int. Cl. B67d 3/00
U.S. Cl. 222—531          13 Claims

ABSTRACT OF THE DISCLOSURE

This low-cost, one-piece plastic container top features an integrally-molded spout and closure combination which is configured to minimize spillage problems when dispensing particulate materials such as table salt from a container into another vessel such as a salt shaker or spoon. Specific embodiments exemplifying the present invention feature a spout and closure combination which is hingedly movable and comprises a flat web with depending spaced walls and an intermediate portion having both a tubular section, preferably adjacent the flat web, and a closed section adapted to permit the tubular section to be hooked over the edge of the receiving vessel.

---

This invention relates to a dispensing apparatus for the spill-free pouring of particulated solids from a container, as well as a closure therefor. More particularly, it relates to a unique integrally-molded plastic combination dispensing spout and closure structure which successfully copes with a number of problems which heretofore have limited the design and convenient usefulness of such structures, as well as the design of the containers on which they are used.

For convenience herein, the invention will be described with particular reference to salt (sodium chloride) dispensers. It should be understood, however, that the invention is not limited thereto and can be embodied in the form of a dispensing apparatus for a wide variety of materials, but, most advantageously, for particulate solids, e.g., various condiments in granular form, granular sugar, granular foodstuffs and other edible and non-edible granular substances.

The packaging of salt and similar granular materials for home consumption presents a number of conflicting and heretofore irreconcilable problems. Because of the very low cost of the commodity itself and the substantial volume in which it is used, it is customarily sold in large but low-cost containers, e.g., 26 oz. paper board, cylindrical packages. Yet the user typically desires to controllably pour small quantities from the container, e.g., a teaspoonful, or to fill other smaller vessels therefrom, e.g., salt shakers. As the average homemaker can testify, the pouring of such small quantities from a large container without spillage is not always successfully accomplished.

One cause of the spillage problem arises from the fact that the pouring spouts are usually so configured and located on the package that they can not be inserted into the mouth of the receiving vessel. Another problem is the uncontrolled flow of salt from the pouring spout when tilting the container for pouring purposes. This results from suddenly exceeding the angle of repose of the material in the container so as to cause the material to flow in surges or slugs. This is difficult to avoid because the containers are opaque, and the disposition of the salt therein unseen. (The angle of repose is the maximum angle or slope at which the material will stay reposed and will not flow or tumble. In the case of household salt, it is about 35 to 40° from the horizontal.)

These surges or slugs are more readily controlled when using straight-sided containers, e.g., right-circular-cylindrical containers. Such configurations, however, otherwise have drawbacks, e.g., ease of slipping from one's grasp. Waisted containers, i.e., containers with intermediate restricted or constricted cross sections, which can be safely grasped and held, have heretofore been considered undesirable as efficient pouring vessels because of salt retention behind the waisted portion. Upon exceeding the angle of repose, the retained salt surges forth suddenly to spurt out of the dispensing opening, thereby causing spillage. Avoidance of such configurations as waisted containers severely limited container design both functionally and aesthetically.

Prior pouring spout and closure designs also resulted in excessive salt entrapment problems within the container. To dispense the residual or trapped salt, it is necessary to upend or otherwise shake the container, thus causing additional spillage problems. Prior art salt dispensers and closures were also so configured that the exiting stream of poured material tended to separate and disperse, again aggravating the spillage problem.

While designs have been proposed to cope with these problems, none has successfully done so and at the same time met the stringent requirement of low cost. Low cost from a production standpoint demands integral, one-piece molding using relatively inexpensive two-section molds and conventional techniques. It also requires ease of assembly, convenience of stacking and the like. It is therefore an object of the present invention to provide a low-cost combination closure and dispensing spout which copes with these and other problems associated with the pouring of particulated solids.

It is a more specific object of the present invention to provide a low-cost combination pouring spout and closure which minimizes spilling problems when dispensing particulated material. Another object is to provide a pouring spout which automatically cuts off the flow of the granular substance when the level of the substance in the receiving vessel reaches the spout. Another object is to provide a pouring spout which may engagedly overlay edge portions of the receiving receptacle and can be inserted into the mouth thereof so as to minimize spillage problems. Another object is to provide a pouring spout which copes with the surging problems encountered when pouring particulated substances, particularly from "waisted" containers and other containers which have irregular configurations.

It is a further object of the present invention to provide a closure and pouring spout which minimizes material entrapment. A further object of the present invention is to provide a pouring spout which converges and concentrates the particulated material as it leaves the container so as to form a non-scattering stream. A further object is to provide a one-piece closure and pouring spout which can be manufactured from inexpensive substantially-inert plastic by low-cost, high-speed, conventional two-die molding techniques. A still further object is to provide a sanitary one-piece combination plastic closure and pouring spout which can be readily snap-fitted as an end-wall member to a container so as to provide in the closed position a substantially flat end surface for ease of container stacking.

These and other objects of the present invention will become apparent as a detailed description thereof proceeds.

In brief, these objects are achieved by a structure which comprises a substantially flat wall member having an opening through it and having securing means such as a depending flange adjacent its periphery for snap-fitting the wall member to the open end of a container, such as a cylindrical salt box. A combination dispensing spout and closure is disposed in said opening and integrally hinged at an edge portion to the flat wall member so as to permit the spout and closure combination to move between a closed non-dispensing position and an open dispensing position.

The spout and closure combination comprises a flat web, one end portion of which forms the aforementioned integral hinge. The flat web registers with said opening and is coplanar therewith when the spout and closure combination is in the closed position, thereby facilitating stacking of the containers during storage, shipping and display. Spaced walls depend from the flat web and are slidably sealed against the side extremities of the opening, at least when the spout and closure combination is in the open position, but preferably throughout the arc of normal closed to open positions. In one preferred embodiment, the sides of the flat web and the spaced walls converge away from the hinge extremity. In such case, the spaced walls have a slightly conical-like or curved configuration, as dictated by the geometry, to maintain the sliding seal or wiping contact with the sides.

An intermediate portion joins the spaced walls and includes an open tubular portion spaced from said flat wall when the spout and closure combination is in the open position, and, preferably, located adjacent to the flat web and having an axis substantially parallel thereto. This open tubular portion features a concave pouring surface (the surface over which the material exits as it leaves the container), free from sharp corners and preferably in the shape of an oval, whereby the exiting material is convergently streamed. The intermediate portion also includes a closed or sealed area or web adapted to limit the flow to the tubular portion and configured to permit the lower exterior surfaces of the tubular portion to engagedly overlay edge portions of a receiving receptacle when the spout and closure are in the open position. Thus the tubular portion can be inserted into the mouth of the receiving vessel. The intermediate portion is in slidably sealing engagement with the flat wall member at least when the spout and closure are in the open and closed positions.

The combination spout and closure is releasably secured in the open or the closed position by cooperating recess and protuberance means. The combination spout and closure can be readily moved between the closed and open positions by digital manipulation. For such purposes, the wall member is recessed sufficiently beneath said flat web to permit the insertion of a fingernail or finger to lift the spout and closure from the closed position. Advantageously, from a sanitary standpoint, the nail or finger need not contact the pouring surfaces of the tubular portion.

Because of recognized advantages, the structure of the present invention is molded as a unitary structure in plastic. The selected plastic should be readily moldable by conventional low cost techniques and should preferably have high strength, reasonable resilience and sufficient body to maintain shape under normal usage. It should also be inert, free from objectionable odors, and should otherwise meet structural, sanitary and aesthetic requirements. Suitable plastics may include, but are not limited to, polyethylenes, polypropylenes, polyamides, acetate-butyrate copolymers, polyvinyl chloride polymers and copolymers, polystyrene, and compatible combinations thereof, preferably polyethylenes and/or polypropylenes, which have what the art refers to as excellent "living hinge" properties. The plastic, particularly those with little tolerance to repeated flexure, may also contain necessary or desirable additives, such as dyes, plasticizers, extenders, and the like, as those skilled in the plastic molding art will recognize. In the specific embodiment hereinafter set forth, the dispensing apparatus is injection-molded from injection-molding grade, high-density polyethylene having a density of about .95, and the salt container on which it is snap-fitted is blow-molded from blow-molding grade high-density polyethylene having a density of about .96.

A particular feature of the apparatus is the fact that when the flat web is disposed at right angles to the flat wall member, the apparatus can be molded in one piece by conventional dual mold techniques. Thus, a relatively inexpensive, simplified, high-speed two-section injection mold, one section approaching in a direction substantially perpendicular to the flat wall member and the other section approaching from the opposite direction, can be employed.

After molding, the combination spout and closure is flexed at its hinge line into the opening of the flat wall member. Its travel in said opening is thereafter limited between a closed position by means of overlapping registering surfaces, and an open position by means of a projecting lip means on the spout and closure combination, which engages a depending flange on the flat wall member. At each extreme of normal movement, i.e., the open and closed positions, recess and registering protuberance means, as previously mentioned, releasably secure the spout and closure combination in position.

The present invention will be more clearly understood from the following detailed description and accompanying drawings wherein:

FIG. 5 is a still-further enlarged sectional view similar to FIG. 4 except that the combination spout and closure is shown in the closed position;

FIG. 7 is a sectional elevation view showing the combination spout and closure in the molding position;

FIG. 8 is a fragmentary overhead plan view again showing the spout and closure in the molding position;

FIG. 9 is a side elevational view also showing the spout and closure combination in the molding position;

FIG. 10 is a bottom plan view of the flat wall member omitting for simplicity and economy of drawing the combination spout and closure;

FIGS. 11, 12 and 13 are fragmentary sectional views of the combination spout and closure in various stages of a pouring operation and illustrate the automatic shut-off feature and the non-spill removal feature;

FIG. 14 is a fragmentary cut-away view on a smaller scale showing how the salt is retained behind the waist of a waisted container, thus aggravating the surging or slugging problem; and FIG. 15 is a fragmentary view showing the flow confluence as the salt leaves the oval-shaped nozzle.

Figure 1:
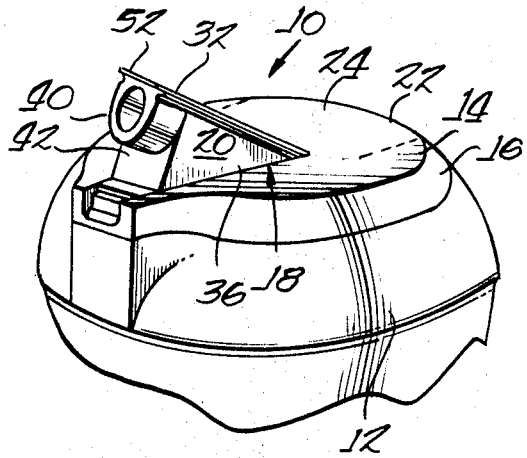
FIG. 1 is a perspective view of a preferred embodiment of the present invention in place on the top of a salt container, only a fragmentary portion of which is shown, the combination spout and closure being shown in the open position.
Figure 2:
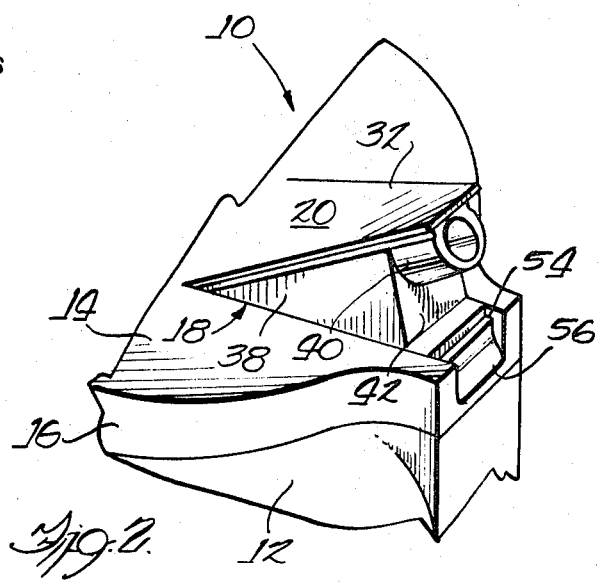
FIG. 2 is an enlarged fragmentary perspective view similar to FIG. 1 but from a different direction.
Figure 3:
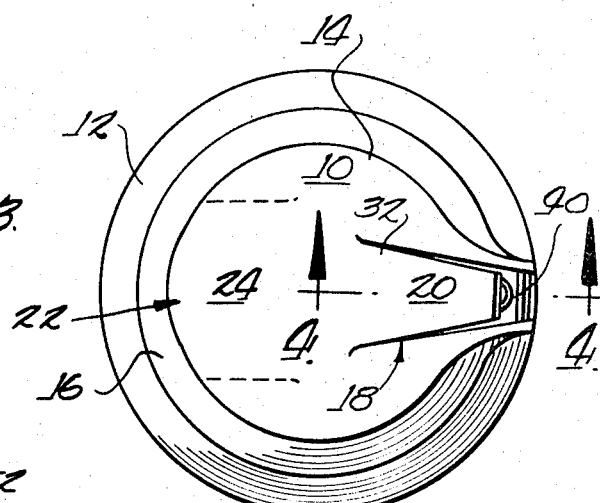
FIG. 3 is an overhead plan view of the apparatus of the present invention in place on the container of FIG. 1, the combination spout and closure again being shown in the open position.

Referring to FIGS. 1 through 4, a preferred embodiment of the dispensing apparatus of the present invention is indicated generally as top member 10 and is mounted, preferably by an internal snap fitting, on a fragmentally-illustrated vessel 12, such as a substantially cylindrical container having a narrowed intermediate waist. While vessel 12 is not, per se, part of the present invention, there are manifestly cooperating and interacting structures between top 10 and vessel 12, as will become apparent hereinafter. For example, the projecting "nose" which houses the closure and pouring spout of top 10 blends into a registering projection on vessel 12.

Dispensing apparatus or top 10 comprises substantially flat wall member 14 which is generally circular except for the aforementioned projecting "nose." To the user, this projecting portion indexes the location of the spout. It also disposes the spout so that there is substantially no residual salt left in the container when "emptying" the same, as is evident from the geometry.

Flat wall member 14 has at least one opening therethrough generally indicated at 18, said opening having an integrally-formed combination dispensing spout and closure 20 mounted therein. In a particular embodiment, wall member 14 may also have a second opening, preferably opposite opening 18, as indicated at 22. In this opening is mounted an integrally-formed sprinkler apparatus and closure which is suggested in dashed lines in FIGS. 1 and 3 at 24. The specific structure of the sprinkler apparatus is not, per se, part of the present invention.

Figure 4:
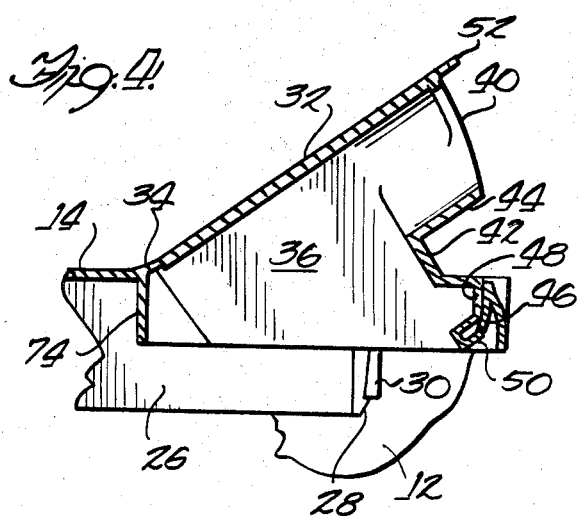
FIG. 4 is an enlarged sectional view taken on line 4—4 of FIG. 3.

As shown in FIG. 4, wall member 14 may in a particular embodiment be snap fitted to vessel 12 by means of a depending flange 26 which has at its lower extremity an enlarged area or rim 28. During assembly, flange 26 is flexed inwardly as top member 10 is moved coaxially into vessel 12 until rim 28 resiliently engages the lower extremity of downwardly depending inner edge 30 of vessel 12. In FIG. 4, flange 26 with rim 28 does not appear in section because it is discontinuous adjacent the closure and pouring spout combination 20, as will be apparent hereinafter from a consideration of FIG. 10. Since the particular form of snap fitting is not, per se, part of the present invention, no further description thereof is necessary. Manifestly, wall member 14 could have depending sides which could constitute the walls of the vessel, thus requiring only a bottom fitting.

Combination spout and closure 20 comprises a substantially flat web 32 which is integrally hinged by means of thinned section 34 to wall member 14. Web 32 substantially registers with the opening 18 in wall member 14 so as to be coplanar therewith when in the closed position, as illustrated in FIG. 5. Spaced walls 36 and 38 depend from flat web 32 and are shaped and configured so as to be in sliding engagement with the respective converging sides of opening 18 (along protuberances 66 and 68, hereinafter mentioned), at least when the spout and closure are in the open position, and preferably throughout all positions of the closure between the normally-open and normally-closed positions. For such purposes, spaced walls 36 and 38 may have a slight curvature, as necessitated by the geometry.

Spaced walls 36 and 38 are joined adjacent the outwardly extending extremity thereof by an intermediate portion comprising outwardly-opening tubular section 40 and a closed section 42. Tubular section 40 is spaced from flat wall member 14 when spout and closure combination 20 is in the open position so that the tubular section can be hooked over a receiving vessel, as hereinafter discussed. In a preferred embodiment as shown, tubular section 40 is adjacent and has an axis substantially parallel to flat web 20. Such disposition minimizes residual flow of material, after automatic cutoff, as hereinafter discussed in connection with FIGS. 11, 12 and 13.

Closed section 42 is adapted to limit granular flow to tubular section 40. It is configured to permit exterior surfaces of tubular section 40 remote from flat web 42, e.g., undersurface 44, to engagedly overlay edge portions of a receiving vessel, such as a salt shaker or spoon.

In a preferred embodiment, the intermediate portion is in slidably sealing engagement with internal depending flange 46 of wall member 14. Thus, as seen in FIG. 4, intermediate sector 48 slidably engages flange 46 in the open position. Similarly, the external surfaces of tubular section 40 slidably engage flange 46 in the closed position.

Figure 6:
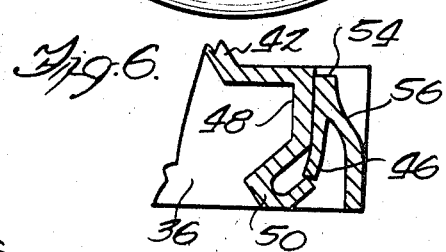
FIG. 6 is an enlarged fragmentary view of a portion of FIG. 4 showing details of the hook which limits movement of the spout and closure.

Combination spout and closure 20 is limited in movement from the normally open position shown in FIG. 4 to the normally closed position shown in FIG. 5. As shown in FIG. 6, it is limited in the open position by projecting hook 50, which engages the lower extremity of flange 46. As shown in FIG. 5, it is limited in the closed position by projecting lip 52 which overlays recessed ledge 54 on wall member 14.

The external surface 56 adjacent ledge 54 is depressed to permit insertion of a finger or fingernail for digital engagement of projecting lip 52 so that the spout and closure combination can be conveniently raised to the open position. The combination of projecting lip 52 and depressed area 56 thus provides a sanitary means for opening the container without any contact of the finger with the pouring surfaces of the spout.

FIGS. 7, 8 and 9 illustrate a particularly advantageous aspect of the present invention, that is, the capability of molding the structure in a simple two-section injection mold. Thus, when the spout and closure combination is in a fully upright position, that is, web 32 is perpendicular to wall member 14, the structure can be molded in its entirety using an injection-type mold, the two sections of which move in opposite vertical directions as viewed in FIG. 7. This is schematically illustrated in FIG. 7 by upper and lower mold sections 58 and 60 which move in the indicated opposed directions. The two mold sections are brought together, the plastic injected, the two mold sections are separated and the resulting structure is readily removed. This avoids the high cost of, and lower production rates associated with, complex multi-section molds. This simplicity of molding is vitally important in meeting the critical low cost requirement.

Conventional molding techniques are employed. For example, one-half degree tapers are provided on vertical surfaces to facilitate removal of the molded structure from the mold. Recesses and the like are sized and configured, e.g., rounded or the like, so that they can be readily snapped from the mold. High-speed, multi-cavity molds are used. These and other techniques are well known to those skilled in the molding arts.

After molding of the structure, the spout and closure combination is flexed at thinned section 34 into opening 18, hook 50 being momentarily deflected past flange 46. Thereafter, as aforementioned, hook 50 limits the travel of the spout and closure in the open position.

Because thinned section 34 is in effect a "memory" hinge, the stresses therein tend to hold the spout and closure 20 in the open position. To positively retain the spout and closure 20 in the open position, channels or recesses 62 and 64 are provided in walls 36 and 38, respectively. These engage rounded, elongated beads or protuberances 66 and 68, respectively, on the inner surfaces of opening 18 in wall member 14. Similarly, the spout and closure combination 20 is held in the closed position by a second pair of channels or recesses 70 and 72 in spaced walls 36 and 38, which also engage protuberances 66 and 68, respectively.

Additional structural strength and rigidity are provided to the top 10 by depending transverse flanges 74, 76 and 78, and optional spaced radial ribs 79a, 79b, etc., as best seen in FIG. 10. These transverse flanges and ribs, in conjunction with depending flange 26 and peripheral portion 16, including edge 80, provide substantial rigidity to the dispensing apparatus, particularly when it is snap fitted to container 12. In fact, the combination of dispensing top 10 and container 12 interact to provide a substantially rigid unitary structure even when molded with relatively thin plastic walls, e.g., 25 to 50 mils.

FIGS. 11, 12 and 13 illustrate the important automatic cutoff feature available with the structure of the present invention. When spout and closure combination 20 is hooked and tilted over the edge of receiving vessel 82 as shown in FIG. 11, e.g., a salt shaker, it continues to pour until the salt or other particulate material reaches the level of tubular portion 40, at which point automatic cutoff occurs, as depicted in FIG. 12. The spout and closure can then be rocked or rotated off the edge, as further depicted in FIG. 13, with only a minor amount of additional particulate material entering the receiving vessel 82. This additional amount or "runoff" is approximately the volume of particulate contained in Zone A of FIG. 13. No further material will flow because the slope of the material does not exceed the angle of repose, e.g., 35° to 40° from the horizontal. The disposition of tubular section 40 adjacent web 32 manifestly minimizes "runoff" and is preferred for present purposes.

The automatic cutoff feature of the present invention overcomes some of the problems associated with the use of waisted containers for particulate materials. This advantage is depicted in FIG. 14. Because of pinched waist 84 on the container, residual salt depicted at 86, the angle of slope of which does not exceed the angle of repose, is trapped behind the waist. In such circumstances, the user normally tilts the container further, resulting in a slug or surge of salt, which could cause spillage. Because of the automatic cutoff feature of the present invention, however, this problem is minimized. Thus, for the first time, it becomes more practical to employ waisted containers and similar constricted containers for the storage and dispensing of particulate materials. This substantially enhances the flexibility of packaging design.

Still another feature of the present invention is illustrated in FIG. 15. Because of the external pouring surfaces 86 of tubular portion 40 are concavely rounded or oval shaped, the exiting stream of particulate material 88 tends to converge in a fine stream. In contrast, flat pouring surfaces and surfaces having sharp corners or the like tend to scatter exiting streams. This feature of the present invention further enhances the non-spill attributes of the structure.

In a specific embodiment of the present invention employed for salt (sodium chloride) dispensing, web 32, including projecting lip 52 is approximately 1¼" long, the other dimensions being related thereto in the proportions generally indicated by the drawings. The opening in tubular portion 40 is generally oval in shape having minimum and maximum transverse dimensions of about ¼" and ⅜" respectively. The external exposed surface of the tube is curved on a radius from thinned hinge 34 of about 1.158". Thus, while the upper internal surface of the tube is about .38" long, the lower internal surface is proportionately shorter. As related to the overall transverse size of a typical grain of salt, i.e., about .015", the tube of the embodiment shown is about 25 times the grain size in length, but may range from about 10 to 50 times in practice. Similarly, the transverse dimensions of the tubular spout may fall into the range of about 10 to 50 times the grain size.

From the above description it is apparent that the objects of the present invention have been achieved. While only certain embodiments have been illustrated, many alternative modifications will be apparent from the above description to those skilled in the art. These and other alternatives are considered within the spirit and scope of the present invention, and coverage thereof is intended by this application.

Having described the invention, what is claimed is:

1. A one-piece molded plastic apparatus suitable for dispensing granular substances comprising:
   (a) a wall member having an opening therethrough with at least an outer extremity adjacent a peripheral portion of said wall member, and including securing means adjacent peripheral portions of said wall member for attachment of said wall member to another wall of a vessel;
   (b) an integrally-formed combination dispensing spout and closure for said opening and hingedly movable therein between a closed non-dispensing position and an open dispensing position, said spout and closure comprising:
      (1) a substantially flat web integrally-hinged at a peripheral end portion to said wall member adjacent an inner extremity of said opening, and substantially registering with said opening when said spout and closure are in the closed position;
      (2) spaced walls depending from said flat web in slidably sealing engagement with side extremities of said opening at least when said spout and closure are in the open position;
      (3) an intermediate portion joining outer margins of said spaced walls including:
         (i) an outwardly-opening elongated tubular section spaced from said wall member when spout and closure are in the open position; and
         (ii) a closed section adapted to limit granular flow to said tubular section and configured to permit exterior surfaces of said tubular section remote from said flat web to engagedly overlay edge portions of a receiving receptacle when spout and closure are in the open position.

2. The apparatus of claim 1 including recess and protuberance means for releasably securing said combination dispensing spout and closure in said open and said closed positions.

3. The apparatus of claim 1 wherein said intermediate portion is in slidably sealing engagement with said wall member at least when said spout and closure are in the open position.

4. The apparatus of claim 1 including projecting hook means on said closed section and a depending flange on said wall member, said projecting hook means engaging said depending flange when said spout and closure are in the open position so as to limit further travel thereof.

5. The apparatus of claim 1 including a recessed portion on said wall member adjacent and beneath said flat web to facilitate the digital opening and closing of said spout and closure.

6. The apparatus of claim 1 wherein the exterior opening of said tubular section has a concave pouring surface whereby the exiting material is convergently streamed.

7. The apparatus of claim 1 wherein said securing means comprises a depending flange with enlarged engageable surfaces adjacent the lower extremity thereof for snap fitting said apparatus to a vessel.

8. The apparatus of claim 1 wherein the sides of said flat web and said spaced walls converge toward said intermediate portion.

9. The apparatus of claim 1 wherein substantially all surfaces are engageable by dual mold cavities approaching from two opposite directions when said flat web is disposed at right angles to said wall member.

10. The apparatus of claim 1 wherein said apparatus is molded of polyethylene.

11. The apparatus of claim 1 wherein said wall member circumjacent said spout and closure is circularly configured, and a portion of said spout and closure projects outwardly therefrom to index the same.

12. The apparatus of claim 1 wherein said wall member is substantially flat and said flat web is substantially coplanar therewith when said spout and closure are in the closed position.

13. The apparatus of claim 1 wherein said apparatus is molded of polypropylene.

References Cited

UNITED STATES PATENTS

| | | | |
|---|---|---|---|
| 3,048,309 | 8/1962 | Albiani | 222—531 X |
| 3,144,180 | 8/1964 | Phillips et al. | 222—531 X |

STANLEY TOLLBERG, Primary Examiner